May 1, 1962 J. W. BECK 3,032,704

VARIABLE IMPEDANCE NETWORK FOR AUTOMATIC GAIN CONTROL CIRCUIT

Filed June 17, 1958

INVENTOR.
JOHN W. BECK

BY Walter J. Madden Jr.

ATTORNEY

United States Patent Office 3,032,704

Patented May 1, 1962

3,032,704
VARIABLE IMPEDANCE NETWORK FOR AUTOMATIC GAIN CONTROL CIRCUIT

John W. Beck, San Jose, Calif., assignor to International Business Machines Corporation, New York, N.Y., a corporation of New York Filed June 17, 1958, Ser. No. 742,608
7 Claims. (Cl. 323—66)

Figure 1:
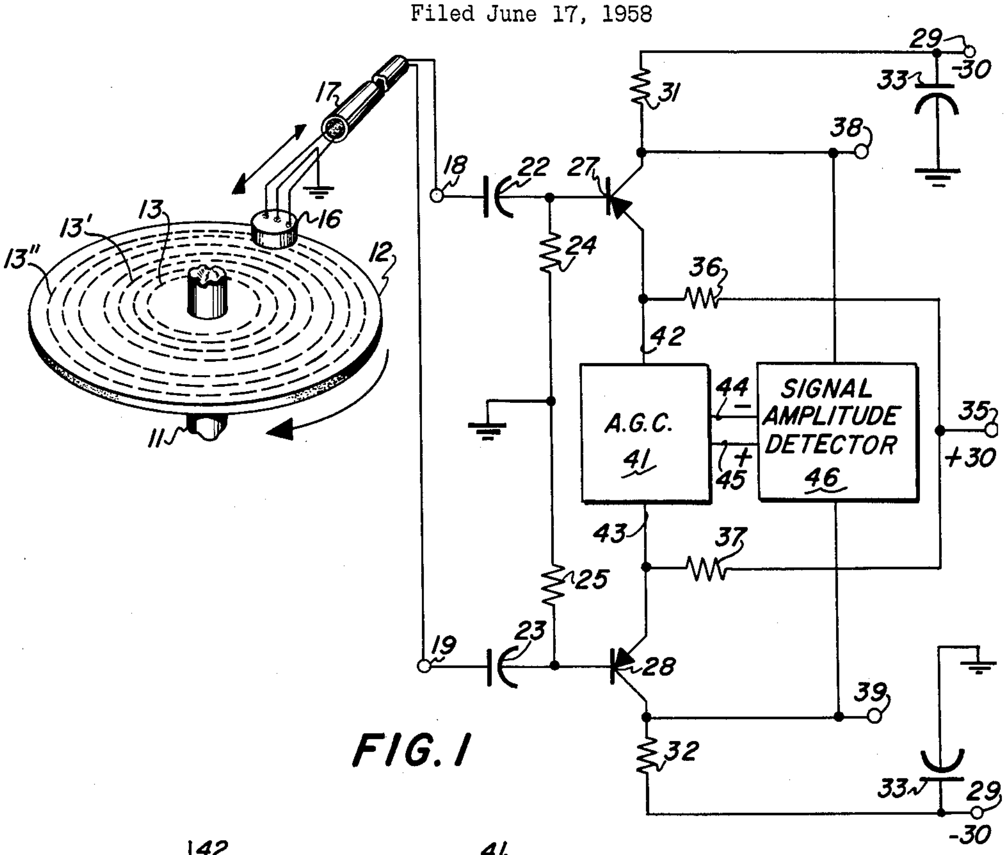

This invention relates in general to amplifying systems including automatic gain control circuits, and relates more particularly to an automatic gain control circuit for use with a transistor amplifier in which the input signals have a wide range of amplitude.

In the field of data processing and digital computers, it is well known to employ a device which stores information in the form of changes in the polarity of magnetization of a magnetizable recording surface. For example, a disc or a drum having a surface coating of a magnetizable material may be passed beneath a transducer which is adapted either to magnetize the moving surface in accordance with an applied electrical signal, or to derive previously recorded signals from the surface. Generally, the information which is recorded on the recording surface is in digital form, in which pulses of substantially constant amplitude represent digits in a binary or other code. Similarly, the computers or other data processing machinery associated therewith are designed to handle pulses of substantially constant amplitude, and pulses of other than constant amplitude are both unnecessary and undesirable.

However, the attainment of reproduced pulses of substantially constant amplitude from the storage device is complicated by many factors, such as variations in the magnetization characteristics of different portions of the recording surface, variations in the spacing between the transducer and the recording surface, or variations in the speed of the recording surface relative to the transducer. An additional source of variations in the amplitude of these signals reproduced from the recording surface arises out of the use of recording surface in the form of rotatable discs. These discs have a plurality of circular recording tracks thereon to which a transducer is selectively positionable for recording from and/or writing on different ones of tracks. In systems using such discs the rotational velocity of the disc is substantially constant, with the result that there is a large variation in linear velocity of the different circular tracks on the disc surface. Since the amplitude of a signal generated by the transducer is a function of the rate of change of the flux underlying the transducer, the amplitude of a signal generated by the transducer in reading a portion of an outside track on such a disc considerably exceeds the amplitude of a signal generated by the transducer in reading one of the inner tracks on the disc.

To overcome the signal amplitude variations some type of automatic gain control is necessary in connection with the amplifying circuits associated with the data storage device. Numerous such automatic gain control circuits have been proposed in the prior art, and some of such circuits employ the selectively conductive properties of diodes to vary the characteristics of the amplifier in response to variations in the amplitude of the output. In one of such prior art automatic gain control circuits, a pair of diodes are connected back-to-back between the cathodes of two push-pull vacuum tube amplifiers, with a measure of the desired automatic gain control being supplied to the junction of the diodes. Variations in the automatic gain control input signal, corresponding to variations in the amplitude of the amplifier output signal, are impressed on the back-to-back diodes so as to render the diodes conductive when the output signal amplitude falls below a predetermined value. This conduction of the diodes decreases the resistance of the circuit, to increase the gain of the amplifier stage and return the output signal amplitude to the desired value.

The above described circuit operates satisfactorily where the signal to be controlled undergoes only relatively small variations in amplitude, but where signals having large variations in amplitude are to be handled, the above described system is subject to the serious disadvantage that the transition range between conductivity and non-conductivity for the diodes is so abrupt that excessive distortion is introduced into the signals.

In a slightly more elaborate prior art automatic gain control system, pairs of back-to-back-connected diodes are used in parallel between the emitters of a pair of push-pull transistors to serve as variable resistances for varying the gain of the amplifier in response to variations in the amplitude of the amplifier output signal. In this system, the automatic gain control input signal is supplied in parallel through a plurality of different resistors to the junction points of the different pairs of diodes. By proper choice of the resistance values of the different resistors so used, each of the parallel branches may be rendered conductive at different levels of the automatic gain control signal, thus producing reasonably smooth change in the overall resistance of the network and thus extending the useful automatic gain control range of the circuit. However, this system has the disadvantage that the currents used to bias the different automatic gain control diodes must also pass through the emitter-to-base diode of the transistors to the push-pull amplifier stage. Thus, when the automatic gain control input signal is very large the large current resulting therefrom necessarily flows through the transistors used in the amplifier stage, with the result that the maximum current dissipation of the transistors is rapidly approached.

Broadly, the present invention contemplates an automatic gain control circuit which is particularly adapted for use with signals which undergo a relatively large amplitude excursion and in which pairs of selectively connected diodes are progressively rendered conductive in response to variations in the automatic gain control input signal. In the present invention, pairs of back-to-back and front-to-front diodes are alternately connected in parallel between the emitter electrodes of the push-pull transistor amplifier. Each of the back-to-back connected pairs of diodes have impressed at the junction thereof an automatic gain control (AGC) input signal having a positive polarity and an amplitude dependent upon variations in the amplifier output signal from a desired value. The pairs of front-to-front connected diodes have impressed on the junctions thereof an AGC input signal having a negative polarity and having an amplitude substantially equal to the amplitude of the positive polarity AGC signal impressed on the junction of the back-to-back diodes. Each of the parallel branches of the AGC network is adapted to be rendered conductive at a different level of AGC input signal amplitude so that as the amplitude of the AGC input signal progressively increases, different ones of the parallel connected branches of the AGC network are rendered progressively conductive to decrease the resistance of the network and increase the gain of the amplifier to return the amplifier output signal amplitude to the desired value. By virtue of the use of the alternate pairs of back-to-back and front-to-front connected diodes, and the use of the positive and negative AGC input signals, return paths are provided for the bias currents of the AGC diodes within the AGC circuitry itself, thus preventing any substantial bias current flow through the transistors of the amplifier.

In one embodiment of the present invention, the different bias levels of the parallel branches of the AGC network are adjusted by means of different resistors connected in circuit with the pairs of diodes so that each of the parallel connected branches has a different voltage level at which it becomes conductive. In an alternative embodiment of the present invention, operation at the different bias levels is obtained by means of a plurality of Zener diodes having different operating characteristics. As is well known in the art, a Zener diode has a sharp breakdown point at a certain reverse voltage applied across the diode, at which point the current through the diode will increase sharply from its normal cutoff value. By using a plurality of such diodes having different breakdown voltage values, the selective control of the different branches of the network may be achieved.

It is therefore an object of the present invention to provide a variable impedance network for an automatic gain control circuit having a plurality of separate branches which are rendered conductive at different voltage levels to achieve the automatic gain control action.

It is an additional object of the present invention to provide a variable impedance network for an automatic gain control circuit having a plurality of parallel connected branches, each of the branches containing a pair of selectively connected diodes which have impressed thereon a measure of the automatic gain control signal, to progressively render the different branches of the network conductive in response to a progressive increase in the amplitude of the automatic gain control signal.

It is an additional object of the present invention to provide a variable impedance network for an automatic gain control circuit having a plurality of parallel connected branches, each of the branches containing a pair of selectively connected diodes which have impressed thereon a measure of the automatic gain control signal through a plurality of diode devices having progressively increasing breakdown voltage levels, so that the different parallel branches are progressively rendered conductive in response to a progressive increase in the amplitude of the automatic gain control signal.

Other objects of the invention will be pointed out in the following description and claims and illustrated in the accompanying drawings which disclose, by way of example, the principle of the invention and the best mode which has been contemplated of applying the principle.

Figure 2:
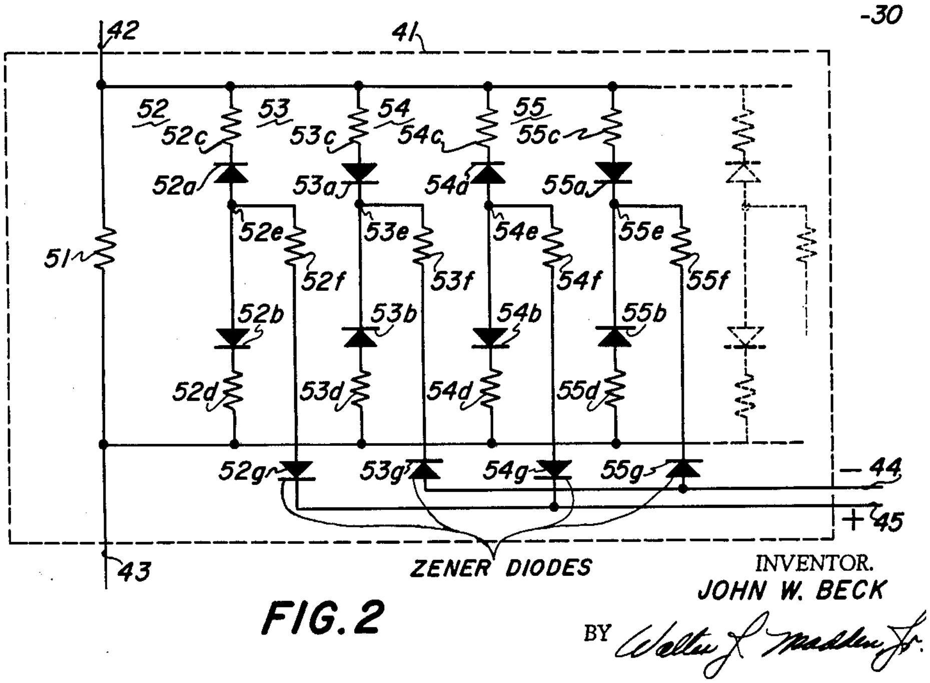

In the drawings:

FIG. 1 is a diagrammatic illustration of a system for deriving signals from a rotating disc and utilizing the gain control circuit of the present invention; and FIG. 2 is a schematic circuit diagram of the automatic gain control network used in the embodiment illustrated in FIG. 1.

Referring to the drawing, FIG. 1 diagrammatically shows an information storage system in which a shaft 11 drives a rotatable disc 12 having a magnetizable surface for storing information thereon. As indicated above, disc 12 may be one of a number of similar discs driven by shaft 11 and having recorded thereon a plurality of substantially circular information tracks 13, 13', 13'', etc. The apparatus may also include a transducer head 16 which is selectively movable radially of rotating disc 12 to cooperate with different ones of the tracks 13, 13', etc., on disc 12 for recording and/or reproducing information from the disc. Transducer 16 is controllably movable by suitable means (not shown) to cooperate with any selected one of the tracks on disc 12.

Transducer 16 may be of any suitable type which is adapted to magnetize different portions of disc 12 in response to a recording signal and to reproduce such recorded information from the disc. Preferably, the coil of transducer 16 is provided with a pair of outer terminals and a grounded center tap. The outer terminals of transducer 16 are connected through suitable conductors to the input terminals 18 and 19 of the amplifier circuit. The conductors transmitting the signal from transducer 16 to the amplifier may be enclosed in a suitable conduit or sheath 17 if the distance between the transducer and the associated amplifying equipment is large. Since transducer 16 is center tapped to ground, equal and opposite pulses appear at the terminals 18 and 19 in response to changes in the magnetization on the surface of disc 12 passing under transducer 16. The pulses appearing at terminals 18 and 19 are passed by a pair of coupling capacitors 22 and 23 and appear across the resistors 24 and 25. The push-pull transistor amplifier includes the transistors 27 and 28 which have impressed thereon the pulses appearing across resistors 24 and 25.

In accordance with conventional practice, in the schematic circuit diagram of FIG. 1, where the emitter electrode of the transistors is indicated by an arrow pointing inwardly, the transistor is a P-N-P type. Additionally, even though only one stage of amplification is illustrated in the embodiment of FIG. 1 in order to simplify the drawing, it will be apparent to those skilled in the art that in practice several such stages of amplification are normally provided to produce the required amplification of the signal detected by transducer 16.

The transistors 27 and 28 receive a negative collector potential from a negative voltage supply, represented by terminals 29, through resistors 31 and 32. Unwanted alternating current components may be filtered from the negative supply voltage by means of capacitors 33. In a similar fashion, the transistors 27 and 28 each receive a positive emitter potential from a positive voltage supply terminal 35, through the resistors 36 and 37. In operation, the transistors 27 and 28 function to supply amplified pulses across the resistors 31 and 32. These output pulses are passed on through a pair of output terminals 38 and 39 to either the next stage of amplification or the apparatus in which the pulses are to be utilized.

The overall gain of the amplifier of FIG. 1 is controlled by varying the value of resistance in the emitter circuits of the transistors 27 and 28. This variation in resistance is accomplished by means of the automatic gain control network 41 in accordance with the present invention. Automatic gain control network 41 is connected to the emitter of transistor 27 by means of a conductor 42, and is connected to the emitter of transistor 28 by means of a conductor 43. Automatic gain control network 41 receives two input signals through a pair of conductors 44 and 45 from a network 46 which samples the amplitude of the output signal appearing across terminals 38 and 39 and produces a positive output voltage and a negative output voltage. Both this positive output voltage and the negative output voltage are equal in amplitude and are a measure of the variation in the amplifier output signal from a desired value. Network 46 may be of any suitable type which will sample the amplitude of the amplifier output appearing between terminals 38 and 39 and provide a positive output signal and a negative output signal which are a measure of the deviation of the amplifier output from a desired value. Preferably, the output voltages of network 46 have a maximum value when the output of the amplifier is zero, and the voltages decrease in amplitude as the amplifier output rises.

FIG. 2 illustrates the details of the automatic gain control network 41. Automatic gain control network 41 includes a plurality of parallel connected branches which are connected in parallel with a resistor 51 between conductors 42 and 43. Network 41 includes a first branch 52 having a pair of back-to-back diodes **52*a* and 52*b* and a pair of resistors 52*c* and 52*d*. Network 41 further includes a second branch network 53 having a pair of face-to-face diodes 53*a* and 53*b* and a pair of resistors 53*c* and 53*d*. Network 41 also includes a branch 54 similar to branch 52 and having a pair of back-to-back diodes 54*a* and 54*b* and a pair of resistors 54*c* and 54*d*. An additional branch 55, similar to branch 53, may be provided having a pair of face-to-face diodes 55*a* and 55*b* and a pair of resistors 55*c* and 55*d*. Further branches may be provided in network 41**, as indicated by the dotted lines, but to simplify the drawing only four such branches have been illustrated.

The junctions **52*e* and 54*e*** of the back-to-back branch networks 52 and 54 are connected through resistors 52f and 54f and diodes 52g and 54g to conductor 45 representing the positive output signal terminal of network 46. There is thus impressed on the back-to-back branches a positive voltage having an amplitude corresponding to the deviation of the amplifier output signal from the desired value. Junctions 53e and 55e of the face-to-face diodes are connected through resistors 54f and 55f and diodes 53g and 55g to conductor 44 representing the negative output signal terminal network 46. Each of diodes 52g through 55g is preferably of the Zener diode type having a relatively sharp reverse breakdown characteristic so that when the reverse voltage applied across the Zener diode exceeds the breakdown value, the current through the diode increases quite abruptly. Each of diodes 52g through 55g preferably has a different breakdown voltage level, with diode 52g having the lowest breakdown voltage and the breakdown voltages for diodes 53g, 54g and 55g progressively increasing. Zener diodes having these characteristics are commercially available and any suitable type may be utilized in the present invention.

The operation of the embodiment illustrated in the drawings is as follows. Assuming that disc 12 is rotating at the desired speed and transducer 16 is positioned to cooperate with the outermost track 13″ on disc 12 to read the information or data recorded thereon, the signal generated by transducer 16 is impressed across terminals 18 and 19 and passed through coupling capacitors 22 and 23 to transistors 27 and 28. The amplified signals from transistors 27 and 28 are supplied through terminals 38 and 39 to the next amplifier stage or to the apparatus in which the amplified pulses are to be utilized. As is well known in the art, the center tap connection and push-pull arrangement illustrated in FIG. 1 serves to cancel any in-phase noise which may be generated in the pickup system, such as stray signals which may be induced by electromagnetic equipment disposed adjacent sheath 17.

Assume that the amplitude of the signal detected by transducer 16 from track 13″ has the maximum desired value and that a minimum amplifier gain is required for this signal. Under these conditions the error generating network 46, which samples the amplitude of the amplifier output signal between terminals 38 and 39 and compares this output signal with a measure of the desired amplitude, produces no output signal, so that no voltage appears on conductors 44 and 45. It will be understood that the system is calibrated with a general knowledge of the maximum amplitude of signals expected and that the total range of AGC control voltage available is so selected as to be capable of exerting control over signals of the highest amplitude expected in the system. With no voltage on conductors 44 and 45, Zener diodes 52g through 55g have substantially no voltage thereacross so that no current flows through these diodes. With diodes 52g through 55g non-conductive, there is no appreciable current flow through any of the parallel branch circuits 52 through 55, since the poling of the diodes in these circuits is such as to prevent current flow under these conditions. Hence, the resistance of network 41 under these conditions is a maximum, thus producing minimum gain in the amplifier.

Now assume that transducer 16 is shifted from the outer track 13″ to, say, track 13′ on disc 12. As indicated above, the decreased linear velocity of track 13′ relative to transducer 16 results in generation by transducer 16 of a signal of lower amplitude. Under these conditions, therefore, the amplitude of the signal generated by transducer 16 is less than its amplitude when the transducer was over the outer track and this signal of decreased amplitude is supplied to the push-pull amplifier in a manner described above. This decrease in the amplifier output signal is sensed by network 46 which generates a pair of signals of equal amplitude and opposite polarity which are supplied through conductors 44 and 45 to automatic gain control (AGC) network 41. The AGC signal of positive polarity from conductor 45 is impressed on junctions 52e and 54e. The voltage level of conductor 45 exceeds the reverse breakdown voltage of diode 52g, so that diode 52g is abruptly rendered conductive to permit current flow through resistor 52f to junction 52e and then in parallel through diodes 52a and 52b. This current flow through diodes 52a and 52b reduces the resistance of these diodes from their former relatively high value to a relatively low resistance of the order of 50 ohms. This resistance decrease of diodes 52a and 52b decreases the overall resistance of network 41, thus increasing the gain of the amplifier to return the signal to the desired amplitude level.

If, however, the resistance change brought about by rendering diodes 52a and 52b conductive is not sufficient to bring the gain of the amplifier up to the desired value, the voltage on conductors 44 and 45 further increases until Zener diode 53g reaches its threshold voltage level, at which level this diode breaks down to permit current flow therethrough. Current then flows through diodes 53a and 53b of branch 53, thus decreasing the resistance of these diodes and the resistance of branch 53, to further increase the gain of the amplifier. If this gain increase is still insufficient to bring the amplitude of the amplified signal to the desired level, the voltage on conductors 44 and 45 reaches the breakdown voltage for Zener diode 54g, at which threshold diode 54g becomes conductive to permit current flow therethrough and through diodes 54a and 54b. This current flow through diodes 54a and 54b decreases the resistance of these diodes to further decrease the resistance of network 41 and further increase the gain of the amplifier.

The action of network 41 thus continues to selectively and progressively cut in different branches of the network as the signal representing the AGC control signal across conductors 44 and 45 progressively increases. It will be seen that after diodes 52g and 53g have broken down, allowing current flow through diodes 52a, 52b, 53a and 53b, there is a return path for current flow through these diodes without requiring that the bias current flow through transistors 27 and 28. This current path is from conductor 45 through conductive diodes 52g to junction 52e, then through diodes 52a and 52b in parallel, then through resistors 53c and 53d and diodes 53a and 53b to junction 53e, then through resistor 53f and conductive diode 53g back to conductor 44. Thus, the bias current for the diodes does not flow through transistors 27 and 28 to produce overloading or saturation of these transistors when a large number of the branch circuits are rendered conductive.

The embodiment of FIG. 2 utilizing Zener diodes 52g through 55g is a preferred form of the invention, since a relatively smooth change in the total resistance of network 41 may be achieved by suitable choice of the characteristics of the different diodes 52g through 55g. However, if desired, Zener diodes 52g through 55g may be eliminated, and the selective cutting in of the different branches may be accomplished by selecting the sizes of resistors 52c, 52d, 52f, 53c, 53d, 53f, 54c, 54d, 54f, 55c, 55d, 55f, so that the different branches are selectively rendered conductive in response to a progressive increase in the AGC control signal level. That is, by providing resistors 52f, 53f, 54f and 55f with progressively increasing values of resistance, and by providing resistors 52c through 55c and 52d through 55d with progressively decreasing values of resistance, a relatively smooth transition or change in the effective resistance of network 41 for increasing values of the AGC signal across conductors 44 and 45 may be achieved.

It will be noted that when only diode 52g is conductive the bias current flowing through this diode will also flow through transistors 27 and 28, since there is no return path for this current when the other Zener diodes are nonconductive. However, as soon as diode 53g becomes conductive, and for conduction of all the other diodes thereafter, return paths are provided for the diode bias currents as discussed above, so that the automatic gain control network of the present invention produces a minimum of additional current flow through the transistors. In practice, it may be possible to omit Zener diode 52*g*, so that the first branch 52 becomes conductive upon appearance of any AGC signal between conductors 44 and 45.

Thus, it will be seen that I have provided a novel automatic gain control circuit especially adapted for use with transistor amplifiers, in which the current flow through the transistors as a result of the operation of the automatic gain control is essentially independent of the number of diode branches used. In practice, the limiting factor controlling the number of diode branches which may be utilized is the capacitance of the diode branches in parallel, since the value of this capacitance may affect the amplifier operation if it is too large.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A network for producing a variable impedance in response to variations in a control voltage comprising a plurality of branches connected in parallel, at least one of said branches having a pair of back-to-back diodes and at least one of said branches having a pair of front-to-front diodes, selection means connected to each of said branches for causing the voltage levels at which each of said branches becomes conductive to be different, and means for impressing said control voltage on said branches between each said pair of diodes to cause the different said branches to become conductive at different levels of said control voltage for varying the impedance of said network.

2. A network for producing a variable impedance in response to variations in a control voltage comprising a plurality of branches connected in parallel, at least one of said branches having a pair of back-to-back diodes and at least one of said branches having a pair of front-to-front diodes, different resistance means associated with each of said branches for varying the voltage levels at which the different ones of said branches become conductive, and means for impressing said control voltage on said branches between each said pair of diodes to cause said different branches to become conductive at different levels of said control voltage for varying the impedance of said network.

3. A network for producing a variable impedance in response to variations in a control voltage comprising a plurality of branches connected in parallel, at least one of said branches having a pair of back-to-back diodes and at least one of said branches having a pair of front-to-front diodes, Zener diode means associated with each of said branches for varying the voltage levels at which the different ones of said branches become conductive, and means for impressing said control voltage on said branches through said Zener diode means between each said pair of diodes to cause said different branches to become conductive at different levels of said control voltage for varying the impedance of said network.

4. A network for producing a variable impedance in response to variations in a control voltage comprising a plurality of branches connected in parallel, said branches including a plurality of branches having pairs of back-to-back diodes and a plurality of branches having pairs of front-to-front diodes and connected alternately with said pairs of back-to-back diodes, selection means connected to each of said branches for causing the voltage levels at which each of said branches becomes conductive to be different, and means for impressing said control voltage on said branches between each said pair of diodes to cause the different said branches to become conductive at different levels of said control voltage for varying the impedance of said network.

5. A network for producing a variable impedance in response to variations in a control voltage comprising a plurality of branches connected in parallel, at least one of said branches having a pair of back-to-back diodes and at least one of said branches having a pair of front-to-front diodes, selection means connected to each of said branches for causing the voltage levels at which each of said branches becomes conductive to be different, means for impressing said control voltage with a positive polarity between said back-to-back diodes, and means for impressing said control voltage with a negative polarity between said face-to-face diodes, to cause the different said branches to become conductive at different levels of said control voltage for varying the impedance of said network.

6. A network for producing a variable impedance in response to variations in a control voltage comprising a plurality of branches connected in parallel, at least one of said branches having a pair of back-to-back diodes and at least one of said branches having a pair of front-to-front diodes, a Zener diode connected to each of said branches, each of said Zener diodes having a different reverse breakdown voltage level, and means for impressing said control voltage on said branches through said Zener diodes between each said pair of diodes, whereby said different Zener diodes become conductive at different levels of said control voltage to permit current flow through the different said branches for varying the impedance of said network.

7. A network for producing a variable impedance in response to variations in a control voltage comprising a plurality of branches connected in parallel, at least one of said branches having a pair of back-to-back diodes and at least one of said branches having a pair of front-to-front diodes, a Zener diode connected to each of said branches, each of said Zener diodes having a different reverse breakdown voltage level, means for impressing said control voltage with a positive polarity between said back-to-back diodes through said Zener diodes, and means for impressing said control voltage with a negative polarity between said face-to-face diodes through the associated ones of said Zener diodes, whereby said different Zener diodes become conductive at different levels of said control voltage to permit current flow through the different said branches for varying the impedance of said network.

References Cited in the file of this patent

UNITED STATES PATENTS

| | | |
|---|---|---|
| 2,434,155 | Haynes | Jan. 6, 1948 |
| 2,547,703 | Hermont | Apr. 3, 1951 |
| 2,581,124 | Moe | Jan. 1, 1952 |
| 2,697,201 | Harder | Dec. 14, 1954 |
| 2,920,291 | Brundage | Jan. 5, 1960 |